United States Patent
Lim (10) Patent No.: US 8,505,061 B2
(45) Date of Patent: Aug. 6, 2013

(54) MOBILE TERMINAL AND METHOD OF REPRODUCING BROADCAST DATA USING THE SAME

(75) Inventor: Yoenlae Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 767 days.

(21) Appl. No.: 11/874,863

(22) Filed: Oct. 18, 2007

(65) Prior Publication Data

US 2008/0098449 A1 Apr. 24, 2008

(30) Foreign Application Priority Data

Oct. 19, 2006 (KR) .................. 10-2006-0101837

(51) Int. Cl.
*H04N 7/173* (2011.01)

(52) U.S. Cl.
USPC ............... 725/131; 725/20; 725/39; 725/109

(58) Field of Classification Search
USPC ..................... 725/131, 20, 39, 109
See application file for complete search history.

(56) References Cited

U.S. PATENT DOCUMENTS

| | | | |
|---|---|---|---|
| 6,775,654 B1 * | 8/2004 | Yokoyama et al. | 704/500 |
| 6,792,007 B1 * | 9/2004 | Hamada et al. | 370/542 |
| 2002/0069218 A1 * | 6/2002 | Sull et al. | 707/501.1 |
| 2004/0021793 A1 * | 2/2004 | Takatori | 348/461 |
| 2004/0116088 A1 * | 6/2004 | Ellis et al. | 455/132 |
| 2004/0133923 A1 * | 7/2004 | Watson et al. | 725/134 |
| 2005/0085184 A1 | 4/2005 | Kaneda | |
| 2005/0114897 A1 * | 5/2005 | Cho et al. | 725/88 |
| 2005/0210145 A1 * | 9/2005 | Kim et al. | 709/231 |
| 2006/0098936 A1 * | 5/2006 | Ikeda et al. | 386/46 |
| 2006/0130119 A1 * | 6/2006 | Candelore et al. | 725/135 |
| 2006/0166708 A1 * | 7/2006 | Kim et al. | 455/573 |

FOREIGN PATENT DOCUMENTS

| | | |
|---|---|---|
| CN | 1607823 | 4/2005 |
| KR | 20040086916 | 10/2004 |
| KR | 20060066636 | 6/2006 |

* cited by examiner

*Primary Examiner* — Jivka Rabovianski
(74) *Attorney, Agent, or Firm* — Lee, Hong, Degerman, Kang & Waimey (57) ABSTRACT

The present invention relates to reproducing broadcast data in a mobile terminal. The present invention comprises receiving broadcast data through a broadcast channel, storing a part of the received broadcast data, receiving a command to reproduce the broadcast data, and reproducing the stored broadcast data from a past time point while continuing to store the part of the received broadcast data.

20 Claims, 10 Drawing Sheets

MOBILE TERMINAL AND METHOD OF REPRODUCING BROADCAST DATA USING THE SAME

CROSS-REFERENCE TO RELATED APPLICATIONS

Pursuant to 35 U.S.C. §119(a), this application claims the benefit of earlier filing date and right of priority to Korean Application No. 10-2006-0101837, filed on Oct. 19, 2006, the contents of which are hereby incorporated by reference herein in their entirety.

FIELD OF THE INVENTION

The present invention relates to a mobile terminal, and more particularly, to a mobile terminal for storing and reproducing broadcast data received through a broadcast channel.

BACKGROUND OF THE INVENTION

Techniques have been developed that allow a user to view a broadcast program at any desired time or while the user is moving. Particularly, various types of mobile digital broadcasting methods, including a digital multimedia broadcasting (DMB) method are now available. In order to provide digital broadcast services to a mobile digital broadcast terminal other than a conventional fixed receiver, digital broadcast standards have evolved. Accordingly, a user may receive digital broadcast contents including a variety of multimedia at any place and at any time.

A user may watch a variety of multimedia contents received from a plurality of broadcast channels using a broadcast terminal that receives a broadcast signal transmitted from a broadcast station. With the introduction of a digital television (TV), multimedia contents are provided in a digital broadcast program and a bidirectional communication service is available. As the use of a mobile and/or portable broadcast terminal becomes widespread, there exists a need for processing and reproducing a broadcast program, provided from a broadcast station, in a variety of signal types.

SUMMARY OF THE INVENTION

The present invention relates to reproducing broadcast data in a mobile terminal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for reproducing broadcast data in a mobile terminal, the method comprising receiving broadcast data through a broadcast channel, storing a part of the received broadcast data, receiving a command to reproduce the broadcast data, and reproducing the stored broadcast data from a past time point while continuing to store the part of the received broadcast data.

Preferably, the past time point is a point of time when the part of the received broadcast data is initially stored. Preferably, the received broadcast data comprises at least two contents having different forms and the part of the received broadcast data stored comprises at least one of the at least two contents having different forms. Preferably, the at least two contents having different forms comprise at least one of video, audio and data.

Preferably, the stored broadcast data corresponds to a portion of a broadcast time. Preferably, storing a part of the received broadcast data comprises receiving a command signal to stop reproduction of the broadcast data received through the broadcast channel, stopping reproduction of the received broadcast data in response to the command signal, extracting the part of the received broadcast data for storage, and storing the extracted broadcast data.

Preferably, the method further comprises deleting the stored broadcast data after reproduction. Preferably, the part of the received broadcast data for storing and the past time point is set by a user, wherein the setting can be modified by the user.

In accordance with another embodiment of the present invention, a mobile terminal for reproducing broadcast data comprises a memory, a broadcast receiving module receiving broadcast data through a broadcast channel, and a controller storing a part of the received broadcast data in the memory and reproducing the stored broadcast data from a past time point.

Preferably, the past time point is a point of time when the part of the received broadcast data is initially stored in the memory. Preferably, the received broadcast data comprises at least two contents having different forms and the part of the received broadcast data stored in the memory comprises at least one of the at least two contents having different forms. Preferably, the at least two contents having different forms comprise at least one of video, audio and data.

Preferably, the stored broadcast data corresponds to a portion of a broadcast time. Preferably, the controller deletes the stored broadcast data after reproduction. Preferably, the part of the received broadcast data for storing and the past time point is set by a user, wherein the setting can be modified by the user.

In accordance with another embodiment of the present invention, a method for reproducing broadcast data in a mobile terminal comprises receiving broadcast data through a broadcast channel, wherein the received broadcast data comprises at least two contents having different forms, storing the received broadcast data, wherein the received broadcast data stored comprises at least one of the at least two contents having different forms, receiving a command to reproduce the broadcast data, and reproducing a part of the stored broadcast data from a past time point while continuing to store the received broadcast data.

Preferably, the at least two contents having different forms comprise at least one of video, audio and data. Preferably, the method further comprises deleting the stored broadcast data after reproduction.

In accordance with another embodiment of the present invention, a mobile terminal for reproducing broadcast data comprises a memory, a broadcast receiving module receiving broadcast data through a broadcast channel, wherein the received broadcast data comprises at least two contents having different forms, and a controller storing the received broadcast data in the memory and reproducing a part of the stored broadcast data from a past time point, wherein the stored broadcast data comprises at least one of the at least two contents having different forms.

Preferably, the at least two contents having different forms comprise at least one of video, audio and data. Preferably, the controller deletes the stored broadcast data after reproduction.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention is related to storing and reproducing broadcast data in a mobile terminal. Hereinafter, exemplary embodiments of the present invention will be described in detail with reference to the accompanied drawings. Wherever possible, like reference numerals will identify similar or identical elements throughout the drawings.

Examples of broadcasting standards mentioned herein include a European DAB (Digital Audio Broadcasting) standard based on Eureka-147 [ETSI EN 300 401], a DVB-H (Digital Video Broadcasting-Handheld) standard, a Media FLO (Forward Link Only) standard developed by Qualcomm, a Korean DMB (Digital Multimedia Broadcasting) standard, a Japanese ISDB-T (Integrated Service Digital Broadcasting-Terrestrial) standard, or the like. The Korean DMB is divided into a T-DMB (Terrestrial-Digital Multimedia Broadcasting) standard based on Eureka-147 and an S-DMB (Satellite-Digital Multimedia Broadcasting) standard using satellites.

Although the above-described examples are examples of mobile digital broadcasting standards, the present invention is not limited to those broadcasting standards mentioned. The present invention also relates to other broadcasting standards including terrestrial broadcasting standards, such as an 8-VSB standard, developed by Zenith and is the American ATSC digital TV standard, or a European DVB-T (Digital Broadcasting-Terrestrial) standard.

Figure 1:
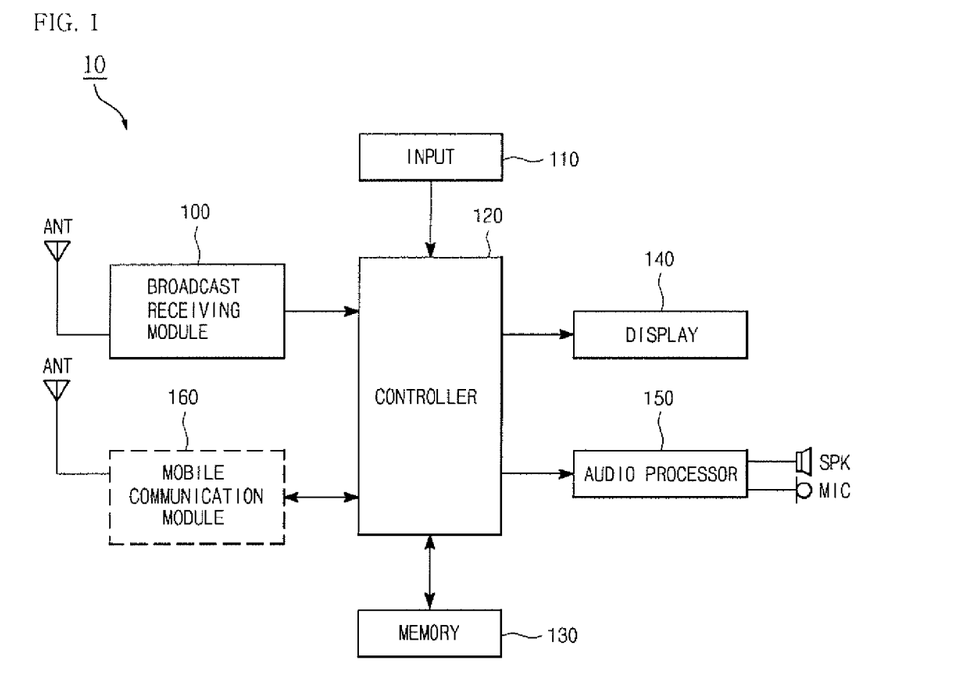
FIG. 1 is a schematic block diagram illustrating a broadcast terminal according to one embodiment of the present invention.
Figure 2:
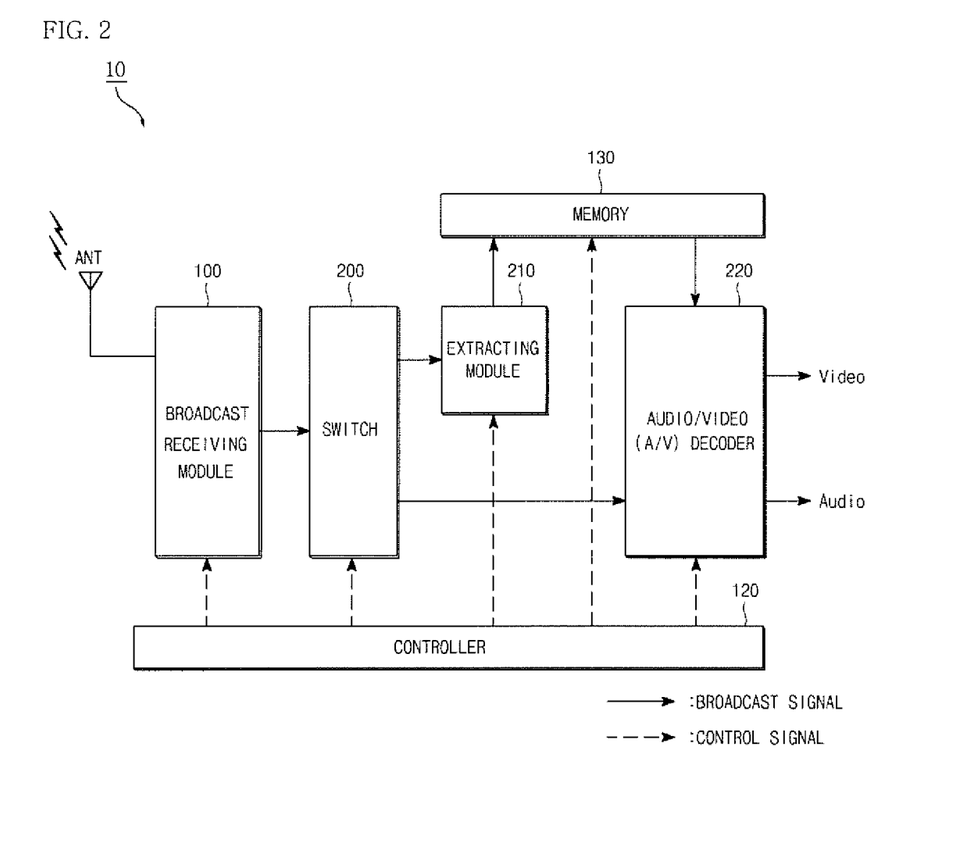
FIG. 2 is a block diagram illustrating a signal flow in a broadcast terminal according to one embodiment of the present invention.

FIG. 1 is a schematic block diagram illustrating a broadcast terminal according to one embodiment of the present invention. FIG. 2 is a block diagram illustrating a signal flow in a broadcast terminal according to one embodiment of the present invention. Referring to FIGS. 1 and 2, a broadcast terminal 10 according to an embodiment of the present invention is described.

The broadcast terminal 10 according to an embodiment of the present invention includes a broadcast receiving module 100, an input 110, a controller 120, a memory 130, a display 140, an audio processor 150, a switch 200, an extracting module 210 and an Audio/Video (A/V) decoder 220. The broadcast receiving module 100 is a wireless communication device that receives a broadcast signal from a broadcasting network. The broadcast receiving module 100 receives a broadcast signal from at least one broadcast channel and demodulates the broadcast signal to be outputted. The broadcast receiving module 100 may include two tuners (not shown) for receiving two broadcast signals simultaneously from two different channels.

The input 110 is an input device that receives a variety of information or a command from a user. The input 110 may be implemented in a touch screen or a keyboard having number key pads, arrow keypads, etc. The memory 130 stores predetermined programs for controlling the overall operation of the broadcast terminal 10, and stores data and various information outputted/inputted when the broadcast terminal 10 is operated. The display 140 is a display device for displaying a status of the broadcast terminal 10 or a variety of information thereof.

The audio processor 150 processes audio to be inputted through a microphone MIC or outputted through a speaker SPK. Preferably, the audio processor 150 outputs information associated with a respective processing and/or controlling operation of the broadcast terminal 10 in an audio form to the speaker SPK, or inputs a variety of information or a command in an audio form through the microphone MIC.

The broadcast terminal 10 may further include a mobile communication module 160. The mobile communication module 160 is a wireless communication device for receiving and transmitting data through a mobile communication network. Preferably, if the mobile communication module 160 is included in the broadcast terminal 10, the mobile communication module 160 provides the broadcast terminal 10 with communication functionality in addition to broadcast program reception capability.

Preferably, the switch 200 transmits broadcast data received through the broadcast receiving module 100 to the extracting module 210 or the A/V decoder 220 according to a control signal provided from the controller 120. The extracting module 210 extracts a part of the broadcast data transmitted from the switch 200 to provide the extracted broadcast data to the memory 130 according to the control signal provided from the controller 120. The A/V decoder 220 decodes the broadcast data provided from the switch 200, or the memory 130, to output the decoded broadcast data to the display 140 and/or the audio processor 150.

The controller 120 controls the respective elements of the broadcast terminal 10 and the overall operation thereof. An operation of the broadcast terminal 10 according to an embodiment of the present invention is described below centering on an operation of the controller 120.

The broadcast receiving module 100 receives broadcast data from a broadcast channel. The received broadcast data is then transmitted to the A/V decoder 220 via the switch 200. The A/V decoder 220 decodes the broadcast data provided from the switch 200 and outputs the decoded broadcast data in a video form and/or an audio form to reproduce the received broadcast data.

Preferably, while reproducing the received broadcast data as described above, the controller 120 controls the switch 200 to transmit the received broadcast data to the extracting module 210 upon receipt of a predetermined command signal from a user through the input 110. The extracting module 210 extracts a part of the broadcast data transmitted from the switch 200 to transmit the extracted broadcast data to the memory 130. Preferably, the part of the broadcast data to be extracted can be set by various methods. Examples of these methods are described as follows.

Figure 3A:
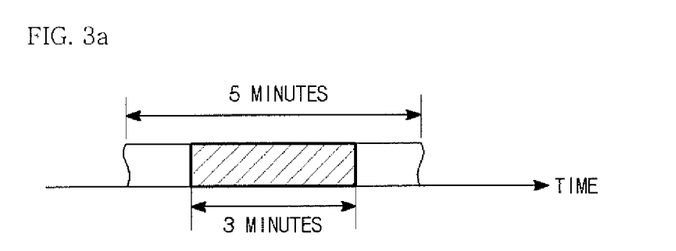
FIGS. 3A and 3B illustrate a part of broadcast data received in sequence of time according to one embodiment of the present invention.
Figure 3B:
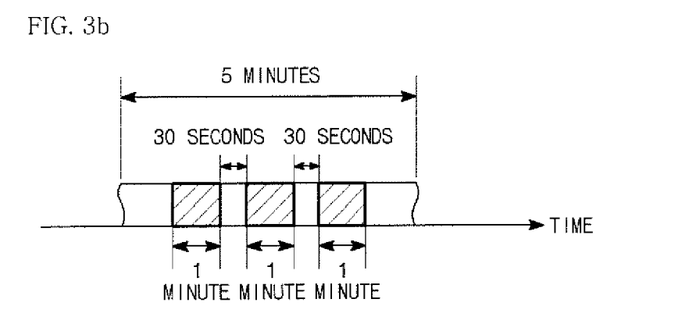

In accordance with one embodiment of the invention, the part of the broadcast data to be extracted may be a portion of the broadcast data received for a certain period of time that is part of the broadcast time. FIGS. 3A and 3B illustrate a part of the broadcast data received in sequence of time. For illustrative purposes, in FIGS. 3A and 3B, the broadcast data received through the broadcast receiving module 100 is transmitted to the extracting module 210 for a predetermined time such as five minutes, for example.

Referring to FIG. 3A, the extracting module 210 performs an extraction operation in a consecutive extraction period (shaded area in FIG. 3A) and performs a non-extraction operation in a consecutive non-extraction period. Referring to FIG. 3B, an extraction period (shaded area in FIG. 3B) and a non-extraction period alternate. Accordingly, the extracting module 210 repeatedly performs an extraction operation in the extraction period for one minute and subsequently performs a non-extraction operation in the non-extraction period for 30 seconds.

Figure 4:
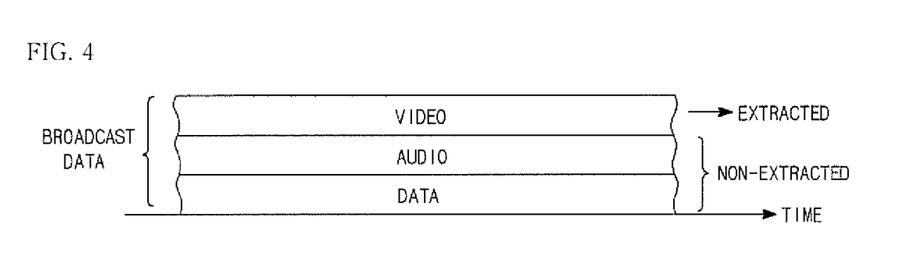
FIG. 4 illustrates broadcast data including video, audio and data according to one embodiment of the present invention.

In accordance with another embodiment of the invention, the part of the broadcast data to be extracted may be at least one of a plurality of contents having different forms included in the received broadcast data. Generally, the broadcast data received through the broadcast receiving module 100 includes at least two contents in different forms. The contents, for example, may be in a video form, an audio form or a data form. FIG. 4 illustrates broadcast data including video, audio and data. Referring to FIG. 4, the extracting module 210 may extract video from the received broadcast data and not audio or data, for example.

In accordance with another embodiment of the invention, the part of the broadcast data to be extracted may be designated by means of a combination of the above two methods. For example, the extracting module 210 may extract audio corresponding to a particular period of time to provide the extracted audio to the memory 130.

Preferably, the extracted portion of the received broadcast data can be stored in the memory 130. Preferably, the extracted portion of the broadcast data can continue to be stored until a reproduction command is received from a user.

In accordance with the present invention, the content to be extracted from the broadcast data may be set by a user. Additionally, the setting may be later changed. For example, a user may designate a setting to store only video among various contents included in the received broadcast data. Alternatively, for example, a user may designate a setting to store only audio among various contents included in the received broadcast data. Accordingly, the designated setting of storing only video or audio contents of the broadcast data may be later changed.

When the controller 120 receives a reproduction command from the user, the controller 120 controls reproduction of the broadcast data stored in the memory 130 from a past time point. Here, a part or all of the broadcast data received through the broadcast receiving module 100 are continuously stored in the memory 130.

For example, the controller 120 receives a command signal from a user through the input 110 that requests the stored broadcast data be reproduced. The controller 120 then controls the reproduction of the broadcast data stored in the memory 130 by the A/V decoder 220 according to the command signal. Herein, the broadcast data initially transmitted from the memory 130 to the A/V decoder 220 corresponds to the broadcast data of the past time point.

Therefore, there may be a predetermined time interval between a time point when the broadcast data is received by the broadcast receiving module 100 and stored in the memory 13 and a time point when the broadcast data is transmitted from the memory 130 to the A/V decoder 220 to be outputted. The past time point may indicate a point of time in the past corresponding to when the broadcast data is received by the broadcast receiving module 100.

Figure 5:
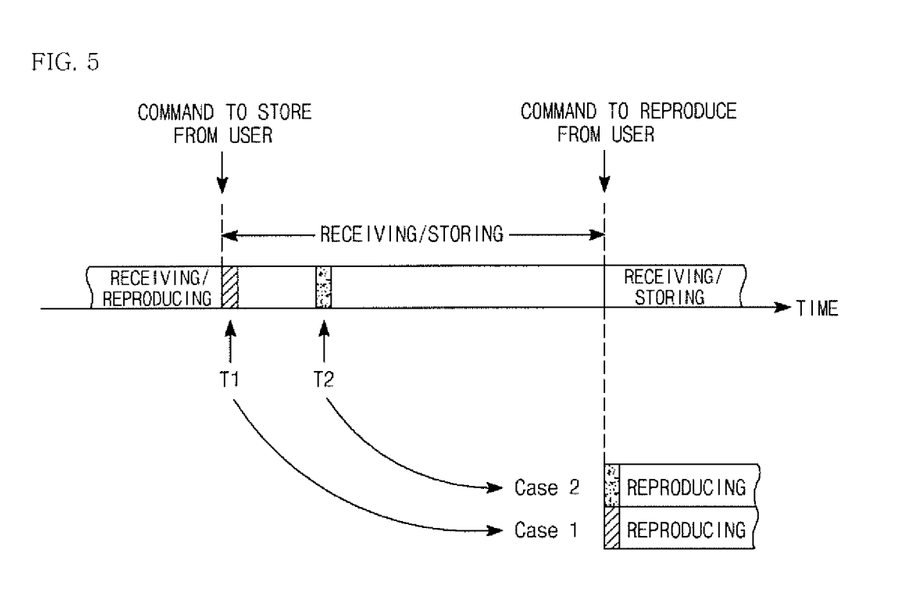
FIG. 5 illustrates reproduction of broadcast data of a past time point in accordance with one embodiment of the present invention.

FIG. 5 illustrates reproduction of broadcast data of a past time point in accordance with one embodiment of the present invention. For example, the past time point may be a point of time when a part of the received broadcast data is initially stored in the memory 130. Referring to FIG. 5, the past time point corresponds to when a store command from a user is received (T1). Accordingly, the broadcast data stored in the memory 130 is controlled by the controller 120 and reproduced from the time point T1 (Case 1 in FIG. 5).

Alternatively, the past time point may be a time point occurring between a time when a part of the received broadcast data is initially stored in the memory 130 and a time when a reproduction command signal is received from the user, for example (T2 in FIG. 5). Accordingly, the broadcast data stored in the memory 130 is controlled by the controller 120 and reproduced from the time point T2 (Case 2 in FIG. 5).

Preferably, the past time point may be set by the user and later changed according to the user's discretion. For example, the past time point may be set by the user to be a point of time when the received broadcast data is initially stored in the memory 130 before a pause command is delivered to the broadcast terminal 10 through the input 100. Thereafter, the user may change the set past time point while the broadcast data stored in the memory 130 is reproduced.

In accordance with the present invention, the controller 120 may control the memory 130 such that the broadcast data provided from the memory 130 to the A/V decoder 220 for reproduction is deleted from the memory 130. Generally, the memory of the broadcast terminal has limited capacity. Thus, it is preferable that the received broadcast data, in its entirety, is not stored in the memory. This is the case for a portable or mobile broadcast terminal in particular. Therefore, by eliminating the broadcast data, which a user has watched or listened to, from the memory 130, the capacity of the memory 130 is efficiently managed.

Figure 6:
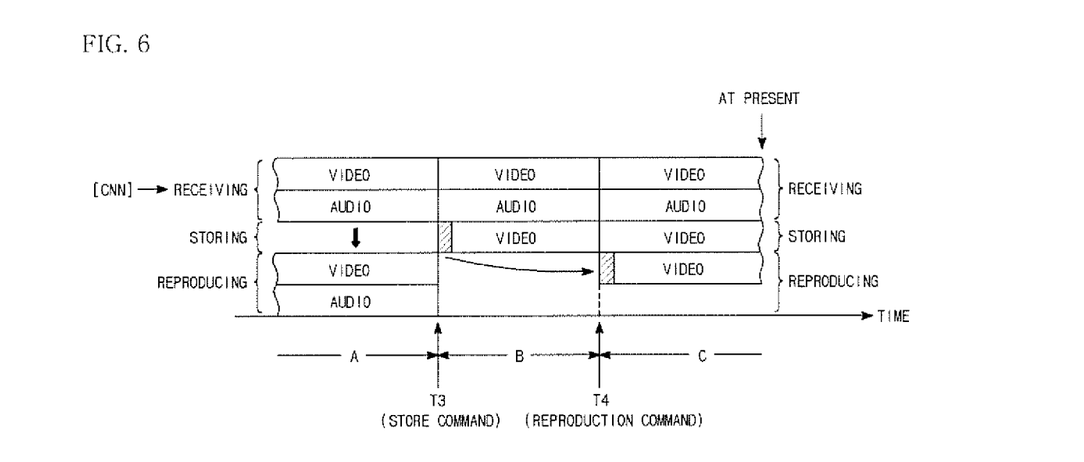
FIG. 6 illustrates receiving, storing and reproducing broadcast data in sequence of time according to one embodiment of the present invention.

FIG. 6 illustrates receiving, storing and reproducing broadcast data in sequence of time according to one embodiment of the present invention. In FIG. 6, the broadcast data includes video and audio.

Referring to FIG. 6, the broadcast data received by the broadcast receiving module 100 is reproduced during section A. Preferably, during this time, a user may watch video outputted to the display 140 and listen to audio processed by the audio processor 150 and outputted to a speaker.

During section B, a part of the received broadcast data is stored in the memory 130 according to a store command from a user. When the part of the received broadcast data is set to "video," only video is stored in the memory 130, as illustrated in FIG. 6. In the section B, the broadcast data received by the broadcast receiving module 100 includes both video and audio.

During section C, the broadcast data stored in response to the store command from the user is reproduced from a past time point. Thus, if the past time point is set to a point of time T3 when the store command is received from the user, the broadcast data stored during section B is reproduced from the beginning of section B (T3, emphasized by a shaded area in FIG. 6). Accordingly, the user may be provided with the broadcast data in video form, but not in audio form, from the time point T3. In the section C, the broadcast data received by the broadcast receiving module 100 includes both video and audio, while the broadcast data stored in the memory 130 includes only video.

Figure 7:
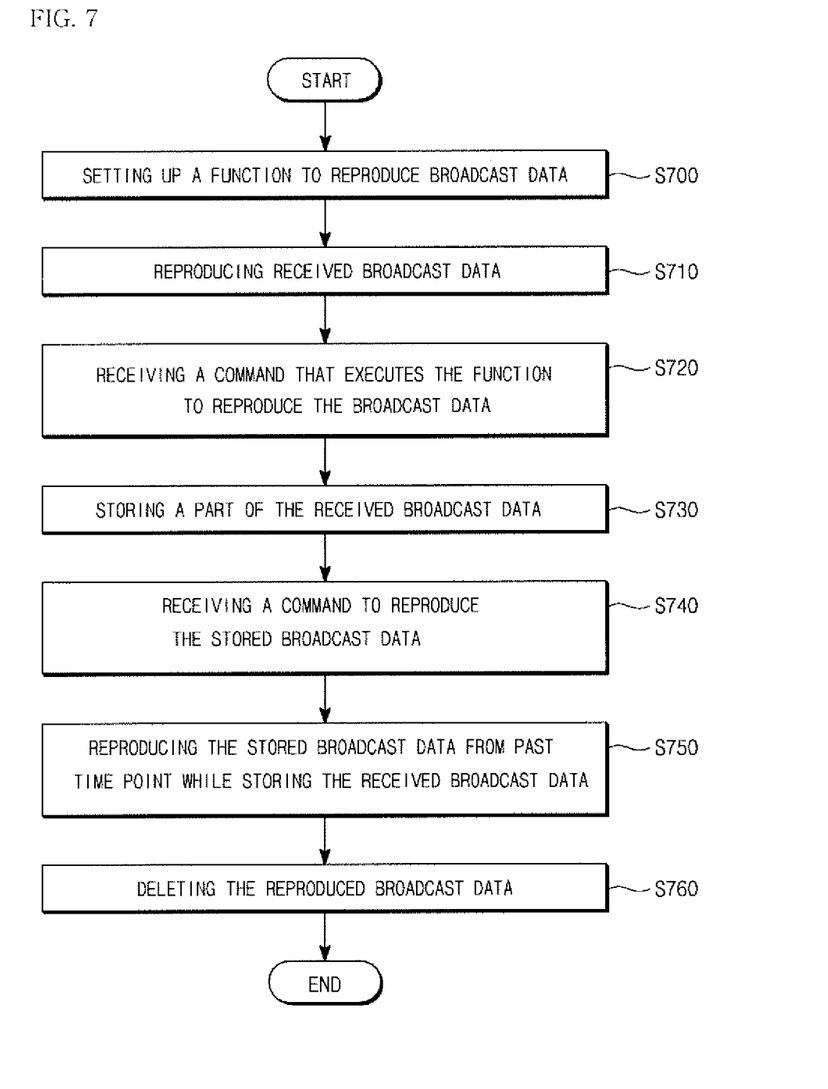
FIG. 7 is a flowchart illustrating a method of reproducing broadcast data of a broadcast terminal according to one embodiment of the present invention.

FIG. 7 illustrates a method of reproducing broadcast data of a broadcast terminal according to one embodiment of the present invention. Referring to FIG. 7, a function for reproducing broadcast data of a broadcast terminal is set (S700). Preferably, a user may set the function to reproduce the broadcast data and the details thereof. For example, the user may designate a part of the broadcast data to be reproduced, or define a past time point to reproduce the broadcast data from. The set up of the reproduction function of the broadcast terminal may be performed at a later time. For example, the user may deactivate the reproduction function of the broadcast terminal. Also, a user may change the designated part of the broadcast data to be reproduced and/or the designated past time point.

Accordingly, broadcast data received through a particular broadcast channel is reproduced (S710). For example, a user may watch a news program on a broadcast "CNN."

While reproducing the broadcast data, an execution command that executes the function to reproduce the broadcast data is received (S720). For example, the user may transmit the execution command to the broadcast terminal by pressing a key in the input 110 assigned to execute the reproduction function.

In response to the execution command, a part of the received broadcast data is stored (S730). Next, a command to reproduce the stored broadcast data is received from the user (S740). For example, the user may transmit the command for reproducing the broadcast data to the broadcast terminal by pressing a predetermined key in the input 110.

In response to the command to reproduce the stored broadcast data, the broadcast data stored in S730 from the past time point is reproduced (step S750). Thereafter, the reproduced broadcast data is erased (S760). Accordingly, the capacity of the terminal memory is efficiently managed.

Figure 8:
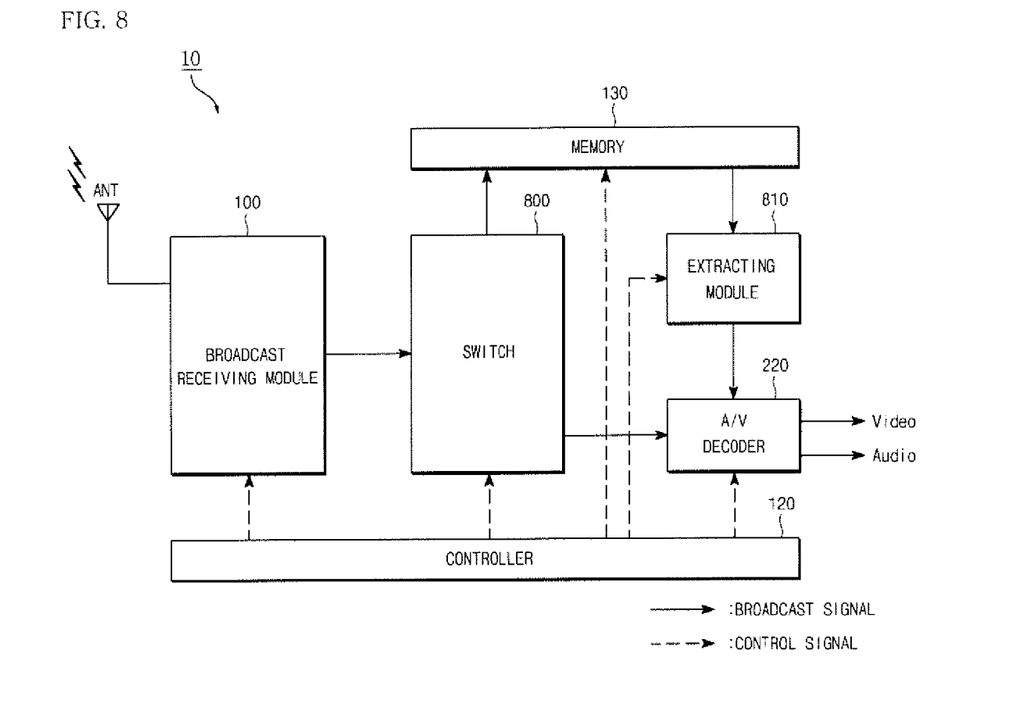
FIG. 8 is a block diagram illustrating a signal flow in a broadcast terminal according to another embodiment of the present invention.

FIG. 8 is a block diagram illustrating a signal flow in a broadcast terminal according to another embodiment of the present invention. Referring to FIGS. 1 and 8, the broadcast terminal 10 according to another embodiment of the present invention includes a broadcast receiving module 100, an input 110, a controller 120, a memory 130, a display 140, an audio processor 150, a switch 800, an extracting module 810 and an Audio/Video (A/V) decoder 220.

The respective elements of the broadcast terminal according to another embodiment of the present invention operate substantially similar to analogous elements in FIG. 1. The difference between the broadcast terminals in FIG. 8 and FIG. 1 is in the process of reproducing a part of the broadcast data received through the broadcast receiving module 100 by means of the respective elements. In FIG. 8, same reference numerals denote the same elements in FIG. 1; however, the switch 800 and the extracting module 810 are designated by different reference numerals for clarification purposes.

The switch 800 transmits broadcast data received through the broadcast receiving module 100 to the memory 130 or the A/V decoder 220 according to a control signal provided from the controller 120. The extracting module 810 extracts a part of the broadcast data transmitted from the memory 130 and provides the extracted broadcast data to the A/V decoder 220 according to the control signal provided from the controller 120.

An operation of the broadcast terminal 10 according to another embodiment of the present invention is described below centering on an operation of the controller 120. The broadcast receiving module 100 receives broadcast data from a broadcast channel. The received broadcast data is then transmitted to the A/V decoder 220 via the switch 800. The A/V decoder 220 decodes the broadcast data provided from the switch 800 and outputs the decoded broadcast data in video and/or audio form to reproduce the received broadcast data. The broadcast data may include at least two contents in different forms. The contents, for example, may be in a video form, an audio form or a data form.

While reproducing the received broadcast data as described above, the controller 120 controls the switch 800 to transmit the received broadcast data to the memory 130 upon receipt of a predetermined command signal from a user through the input 110. And, in case the controller 120 receives a reproduction command from a user through the input 110 while storing the received broadcast data in the memory 130, the controller 120 controls reproduction of the part of the broadcast data stored in the memory 130 from a past time point. Preferably, all of the broadcast data received through the broadcast receiving module 100 are continuously stored in the memory 130.

Preferably, the controller 120 controls the broadcast data stored in the memory 130 to be transferred to the extracting module 810, while continuously storing the broadcast data received through the broadcast receiving module 100. Preferably, the broadcast data that is initially transferred to the extracting module 810 is the data corresponding to the past time point.

The extracting module 810 extracts a part of the broadcast data provided from the memory 130 and provides the extracted broadcast data to the A/V decoder 220. Here, the detailed description of the extracted part of the broadcast data and the past time point are substantially the same as discussed above.

In accordance with the present invention, the controller 120 may control the memory 130 to remove the part of the broadcast data, which is provided from the extracting module to the A/V decoder 220 and reproduced. Furthermore, the controller 120 may control the deletion of the part of the reproduced broadcast data and other broadcast data synchronized thereto from the memory 130. For example, when the broadcast data includes video and audio, and only the audio of the broadcast data is reproduced, the reproduced audio, and video synchronized to the reproduced audio, may all be deleted from the memory 130.

Figure 9:
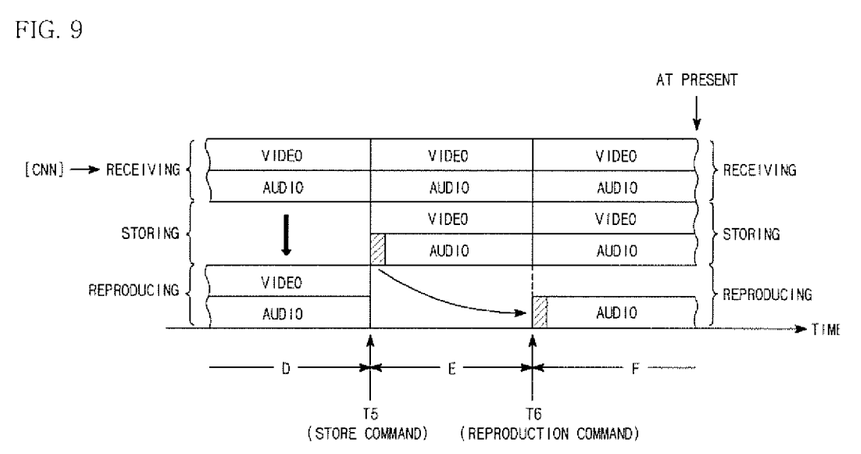
FIG. 9 illustrates receiving, storing and reproducing broadcast data in sequence of time according to another embodiment of the present invention.

FIG. 9 illustrates receiving, storing and reproducing broadcast data in sequence of time according to another embodiment of the present invention. Preferably, the broadcast data in FIG. 9 includes video and audio.

Referring to FIG. 9, during section D, video and audio received through the broadcast receiving module 100 are all reproduced. Accordingly, a user may watch the video outputted to the display 140, and listen to the audio processed by the audio processor 150 and outputted to a speaker.

During section E, the received broadcast data is stored in the memory 130 according to a store command from a user. The broadcast data stored during the section E includes both video and audio.

During section F, only audio of the stored broadcast data is reproduced according to a reproduction command from a user. Accordingly, the part of the stored broadcast data to be reproduced is set as "audio." Preferably, the broadcast data reproduced in response to the reproduction command is reproduced from a past time point. Thus, if the past time point is set to a point of time T5 when the store command is received from the user, the audio in the stored broadcast data is reproduced from the beginning of section E (T5, emphasized by a shaded area of FIG. 9). Accordingly, the user may listen to the audio, and not the video, from the time point T5. The broadcast data received and stored in the section E include both video and audio.

Figure 10:
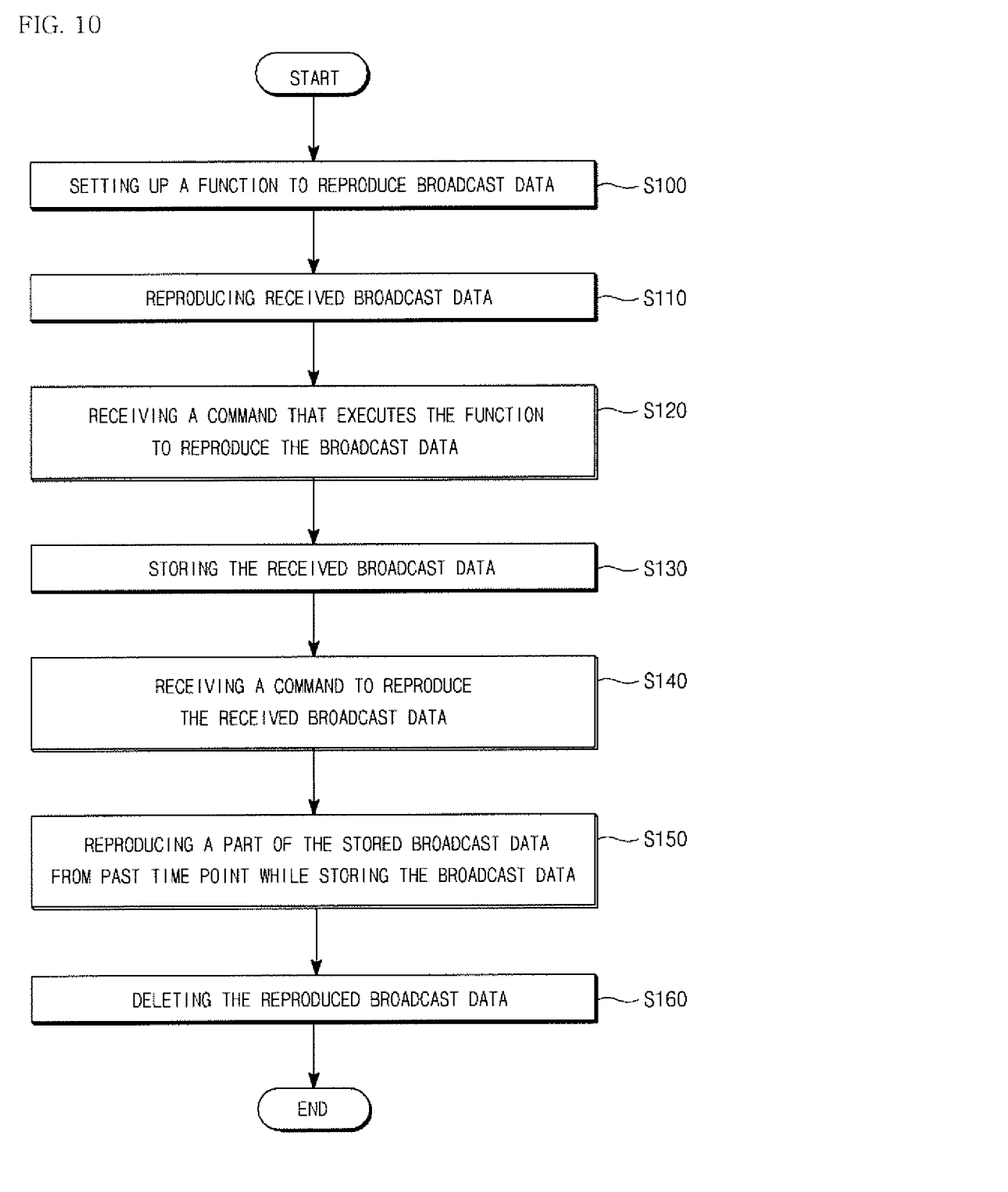
FIG. 10 is a flowchart illustrating a method of reproducing broadcast data in a broadcast terminal according to another embodiment of the present invention.

FIG. 10 is a flowchart diagram illustrating a method of reproducing broadcast data in a broadcast terminal according to another embodiment of the present invention. Referring to FIG. 10, a function for reproducing broadcast data is set up (S100) similar to S700 in FIG. 7. Then, broadcast data received through a specific broadcast channel is reproduced (S110) similar to S710 in FIG. 7. For example, a user may watch a sports program on a broadcast "ESPN."

While reproducing the broadcast data, an execution command that executes a function for reproducing the broadcast data is received (S120). In response to the execution command, the received broadcast data is stored (step S130). Preferably, the received broadcast data in its entirety is stored in S130. Next, a command to reproduce the received broadcast data is received from a user (S140).

According to the command to reproduce the broadcast data, a part of the broadcast data already stored in step S130 is reproduced from a past time point while the received broadcast data continues to be stored (S150). Thereafter, the reproduced broadcast data may be deleted (S160). Preferably, the deleted broadcast data may include a part of the reproduced broadcast data and other broadcast data synchronized thereto. Thus, by performing S160, the capacity of the terminal memory is efficiently managed.

In accordance with the above embodiments, the function to reproduce the broadcast data is initiated by a user command from a user; however, it may be automatically initiated in response to a specific event. For example, when a power supply of the broadcast terminal is interrupted or a battery is low, the function to reproduce the broadcast data according to an embodiment of the present invention may be automatically performed. Thus, a user may watch or listen to a broadcast program for a longer period of time.

Preferably, a low-battery power threshold level needed to automatically initiate the function to reproduce the broadcast data may be preset. In addition, the criteria, e.g., what time or contents of the broadcast data is to be reproduced may be determined prior to when the function to reproduce the broadcast data is automatically performed.

The broadcast terminals or the methods of reproducing broadcast data according to the embodiments of the present invention have the following advantages. First, a user may watch a part of the broadcast data from a past time point while storing the broadcast data received from a broadcast channel. Second, the user may select and watch the broadcast data from a past time point according to his/her taste, which makes the broadcast terminal marketable.

Third, not all of the broadcast data is necessarily stored. Thus, the memory capacity of the broadcast terminal is secured. Fourth, part of the broadcast data is stored or reproduced so that the power supply of the broadcast terminal is managed. For example, when the battery is low, only a part of the broadcast data may be reproduced so that the broadcast data in its entirety can be stored and reproduced.

Fifth, when a power supply of the broadcast terminal is interrupted or a battery is low, a user may select a part of the broadcast data to reproduce rather than the entire broadcast data. For example, a user may select to reproduce only audio of the broadcast data that includes both video and audio. Accordingly, the user may listen to the audio for a longer period of time rather than when the user both watches and listens to video and audio, but only for a shorter period of time.

Having described the embodiments of the present invention and its advantages, it is noted that various changes, substitutions and alterations can be made herein without departing from the spirit and scope of the invention as defined by the appended claims.

What is claimed is:

1. A method for reproducing broadcast data in a mobile terminal, the method comprising:
    receiving broadcast data through a broadcast channel, wherein the broadcast data comprises a plurality of contents having at least a video portion and an audio portion and the video portion and the audio portion are independently reproducible in the mobile terminal;
    periodically extracting only the audio portion from the received broadcast data according to a predetermined extraction period when a battery power level is lower than a threshold level;
    storing the extracted only audio portion according to a first setting;
    reproducing both the video portion and the audio portion when the battery power level is equal to or greater than the threshold level; and
    reproducing only the stored extracted audio portion from a past time point in response to a first command received when the battery power is lower than the threshold level.

2. The method of claim 1, wherein the past time point is a point of time when the extracted audio portion of the plurality of contents is stored.

3. The method of claim 1, wherein the first setting is set and modified by a user.

4. The method of claim 3, wherein the plurality of contents further include a data portion.

5. The method of claim 1, wherein the stored audio portion of the plurality of contents corresponds to a portion of a broadcast time.

6. The method of claim 1, further comprising:
    reproducing the received broadcast data before only the audio portion is extracted from the received broadcast data;

stopping reproduction of the received broadcast data in response to a second command received during the reproduction of the received broadcast data.

7. The method of claim 1, further comprising deleting the stored audio portion of the plurality of contents after the reproduction of the stored audio portion.

8. The method of claim 1, wherein the past time point is set and modified by a user.

9. The method of claim 1, wherein the first setting indicates to extract and store only the audio portion where the first setting is settable to extract only the video portion, only the audio portion, or both the video portion and the audio portion.

10. The method of claim 1, wherein the first setting is changeable to extract and store only the video portion of the received broadcast data.

11. The method of claim 1, further comprising:
continuing to store the extracted audio portion of the plurality of contents while the stored audio portion of the plurality of contents is reproduced.

12. A mobile terminal for reproducing broadcast data, the mobile terminal comprising:
a memory;
a broadcast receiving module configured to receive broadcast data through a broadcast channel, wherein the broadcast data comprises a plurality of contents having at least a video portion and an audio portion, and wherein the video portion and the audio portion are independently reproducible in the mobile terminal; and
a controller configured to:
periodically extract only the audio portion from the received broadcast data according to a predetermined extraction period when a battery power level is lower than a threshold level;
store the extracted only audio portion in the memory according to a setting;
reproduce both the video portion and the audio portion when the battery power level is equal to or greater than the threshold level; and
reproduce only the stored extracted audio portion from a past time point in response to a command.

13. The mobile terminal of claim 12, wherein the past time point is a point of time when the extracted audio portion of the plurality of contents is stored.

14. The mobile terminal of claim 12, wherein the setting is set and modified by a user.

15. The mobile terminal of claim 14, wherein the plurality of contents further include a data portion.

16. The mobile terminal of claim 12, wherein the stored audio portion of the plurality of contents corresponds to a portion of a broadcast time.

17. The mobile terminal of claim 12, wherein the controller is further configured to delete the stored audio portion of the plurality of contents from the memory after the reproduction of the stored audio portion.

18. The mobile terminal of claim 12, wherein the past time point is set and modified by a user.

19. A method for reproducing broadcast data in a mobile terminal, the method comprising:
receiving broadcast data through a broadcast channel, wherein the broadcast data comprises at least a video portion and an audio portion, and the video portion and the audio portion are independently reproducible in the mobile terminal;
extracting and storing only one of the video portion or the audio portion from the received broadcast data according to a changeable setting when a battery power level is determined to be lower than a threshold level;
reproducing both the video portion and the audio portion when the battery power level is equal to or greater than the threshold level; and
reproducing only the stored audio portion from a past time point when the battery power level is determined to be lower than a threshold level,
wherein the setting comprises at least:
a first changeable setting for storing only the video portion; and
a second setting for storing only the audio portion.

20. A mobile terminal for reproducing broadcast data, the mobile terminal comprising:
a memory;
a broadcast receiving module configured to receive broadcast data through a broadcast channel, wherein the broadcast data comprises at least a video portion and an audio portion, and the video portion and the audio portion are independently reproducible in the mobile terminal; and
a controller configured to:
extract and store only one of the video portion or the audio portion from the received broadcast data according to a changeable setting when a battery power level is determined to be lower than a threshold level;
reproduce both the video portion and the audio portion when the battery power level is equal to or greater than the threshold level; and
reproduce only the stored audio portion from a past time point when the battery power level is determined to be lower than a threshold level, wherein the changeable setting comprises at least:
a first setting for storing only the video portion; and
a second setting for storing only the audio portion.

* * * * *